United States Patent
Jenson et al.

(10) Patent No.: US 10,913,588 B2
(45) Date of Patent: Feb. 9, 2021

(54) SYSTEM AND METHOD FOR PROVIDING A SCREEN PROTECTOR

(71) Applicant: ZAGG Intellectual Property Holding Co., Inc., Midvale, UT (US)

(72) Inventors: Mike Jenson, Midvale, UT (US); Doug Reynolds, Midvale, UT (US); Davin Saderholm, Midvale, UT (US)

(73) Assignee: ZAGG Intellectual Property Holding Co., Inc., Midvale, UT (US)

( * ) Notice: Subject to any disclaimer, the term of this patent is extended or adjusted under 35 U.S.C. 154(b) by 38 days.

(21) Appl. No.: 15/914,605

(22) Filed: Mar. 7, 2018

(65) Prior Publication Data

US 2018/0257840 A1 Sep. 13, 2018

Related U.S. Application Data

(60) Provisional application No. 62/469,659, filed on Mar. 10, 2017.

(51) Int. Cl.
| | |
|---|---|
| *B65D 81/127* | (2006.01) |
| *B65D 81/20* | (2006.01) |
| *B65D 1/34* | (2006.01) |
| *B65D 75/30* | (2006.01) |
| *B65D 77/04* | (2006.01) |
| *B32B 37/10* | (2006.01) |
| *B65D 81/02* | (2006.01) |

(52) U.S. Cl.
CPC ...... *B65D 77/0406* (2013.01); *B32B 37/1018* (2013.01); *B65D 1/34* (2013.01); *B65D 75/305* (2013.01); *B65D 81/025* (2013.01); *B65D 81/2007* (2013.01); *B65D 81/2023* (2013.01); *B65D 81/127* (2013.01); *B65D 2585/6835* (2013.01)

(58) Field of Classification Search
CPC  B65D 81/127; B65D 81/025; B65D 81/2007; B65D 81/2023; B65D 1/34; B65D 75/305; B65D 77/0406; B65D 2585/6835; B29C 63/02; B32B 37/1018; B32B 37/12; B32B 2457/20; H04M 1/185
USPC .................................................. 206/521, 320
See application file for complete search history.

(56) References Cited

U.S. PATENT DOCUMENTS

| | | | |
|---|---|---|---|
| 2015/0107775 A1* | 4/2015 | Louie | B29C 70/44 156/382 |
| 2015/0150734 A1* | 6/2015 | Snell | A61F 13/15747 206/494 |
| 2017/0297268 A1* | 10/2017 | Witham | G06F 1/1626 |

* cited by examiner

*Primary Examiner* — Andrew D Perreault
(74) *Attorney, Agent, or Firm* — Thorpe, North & Western, LLP (57) ABSTRACT

A system and method for providing a screen protector to a portable handheld electronic device or cell phone with a user facing surface comprises a mold having an outer surface matching a user facing surface. A stack of layers including the screen protector is disposed over the outer surface of the mold. A vacuum bag receives and surrounds the stack of layers disposed over the mold. The vacuum bag is sealed and evacuated of air. The screen protector is heated and/or cured while in the vacuum bag to shape the screen protector over the mold to have curved lateral edges matching curved lateral edges of the outer surface of the mold and the user facing surface of the display screen of the cell phone. The vacuum bag maintains the curved lateral edges of the screen protector against the curved lateral edges of the outer surface of the mold.

5 Claims, 6 Drawing Sheets

SYSTEM AND METHOD FOR PROVIDING A SCREEN PROTECTOR

PRIORITY CLAIM

Priority is claimed to U.S. Provisional Patent Application Ser. No. 62/469,659, filed Mar. 10, 2017, which is hereby incorporated herein by reference in its entirety.

BACKGROUND

Field of the Invention

The present invention relates generally to screen protectors for portable handheld electronic devices, such as cellular phones.

Related Art

Screen protectors are often added to cellular phones to protect their screens. Some cellular phones have screens that continue to a lateral edge of the cellular phone and include curved edges. Such curvature has presented difficulties for screen protectors. Prior flat screen protectors can be easier to package and ship, while curved screen protectors increase thickness and require more space during shipping. In addition, the curved screen protectors can be more easily damaged.

SUMMARY OF THE INVENTION

It has been recognized that it would be advantageous to develop a system and method for providing a screen protector with curved edges for portable handheld electronic devices, such as cellular phones. In addition, it has been recognized that it would be advantageous to develop a system and method for maintaining curved edges of screen protectors during shipping, and prior to installation on portable handheld electronic devices. In addition, it has been recognized that it would be advantageous to develop a system and method to facilitate manufacture, packaging and shipping of screen protectors with curved edges for portable handheld electronic devices.

The invention provides a system to provide screen protection to a portable handheld electronic device. The portable handheld electronic device has a display screen and curved lateral edges, defining a user facing surface. The system comprises a mold having an outer surface with a size and shape to substantially match the user facing surface of the portable handheld electronic device. The outer surface of the mold has a flat center and curved lateral edges. A stack of layers is disposed over the outer surface of the mold. The stack of layers comprises at least: a screen protector having a lateral perimeter substantially matching a lateral perimeter of the display screen of the portable handheld electronic device, and having a flat center and curved lateral edges; an adhesive layer on the screen protector; an inner release liner covering the adhesive layer and disposed over the outer surface of the mold; and an outer release liner disposed over the screen protector. A vacuum bag receives and surrounds the stack of layers disposed over the mold. The vacuum bag is sealed and evacuated of air. The vacuum bag maintains the curved lateral edges of the screen protector against the curved lateral edges of the outer surface of the mold.

In addition, the invention provides a method for providing screen protection to a portable handheld electronic device. The portable handheld electronic device has a display screen and curved lateral edges, defining a user facing surface. The method comprises providing a mold having an outer surface with a size and shape substantially matching the user facing surface of the portable handheld electronic device. A screen protector is shaped over the mold to have a shape substantially matching the outer surface of the mold, and thus the user facing surface of the portable handheld electronic device. The screen protector is maintained over the mold during shipping.

In accordance with a more detailed aspect of the invention, the mold with the screen protector thereon can define a layered part pre-assembly. Shaping the screen protector over the mold can further comprise disposing the layered part pre-assembly in a vacuum bag. The vacuum bag can be sealed and evacuated with the layered part pre-assembly therein, defining a vacuum bag pre-assembly. The screen protector can be heated and/or cured while in the vacuum bag to shape the screen protector over the mold to have the curved lateral edges substantially matching the curved lateral edges of the display screen of the portable handheld electronic device, defining a final assembly. The final assembly can be inserted into a retail package.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The term "portable handheld electronic device" is used herein to refer to a laptop computer, tablet or tablet computer, phablet, cellular or cell phone, game, and the like, with a display screen, and that is portable and handheld. The display screen can be a touch screen that can receive input by touch such as finger swipes, and/or can have a virtual keyboard. The device can have a battery and memory and a processor with software running thereon. The device can have cellular, WiFi and/or Bluetooth connectivity, and can have a wireless transmitter, receiver, or transceiver. Thus, the device can provide internet browsing, game playing, movie and picture display, e-book display, etc. In addition, the device can include a digital camera. Throughout the description, the term "cell phone" will be used as an example of the portable handheld electronic device, and such use of the term "cell phone" includes all portable handheld electronic devices.

The term "screen protector" is used herein to refer to a layer or film placed on or over a display screen of the portable handheld electronic device to provide protection to the display screen. The screen protector can comprise one or more layers, such as an adhesive layer, etc. The screen protector can be transparent such that the display screen can be viewed through the screen protector. The screen protector can be rigid enough to maintain its shape and be self-supporting. In one aspect, the screen protector can be disposed directly on the display screen. In another aspect, the screen protector can be disposed over and above the display screen, with a space or gap therebetween. The screen protector can have a size and shape to substantially match or cover the display screen. In addition, the screen protector can extend beyond the display screen and cover other portions of a user surface of the portable handheld electronic device. The screen protector can have notches or cut-outs in the perimeter thereof, and/or apertures therethrough, to accommodate accessories of the portable handheld electronic device, such as a camera lens, a speaker, a button, etc. In addition, the screen protector can have lateral sides that are curved to match or follow a curvature of the display screen, which can have curved lateral sides extending to lateral edges of the portable handheld electronic device. The outermost lateral edges of the screen protector can contact the display screen to eliminate a gap at the lateral perimeter of the screen protector and the display screen. Thus, the curvature of the lateral edges of the screen protector can have a slightly different curvature than the lateral edges of the display screen.

The term "retail packaging" is used herein to refer to a package in which the screen protector of the present invention is sold and/or displayed for sale. The package can comprise a box, bag or envelope with graphics and/or indicia thereof. The graphics and/or indicia can comprise pictures of the screen protector in use, logos, instructions for use and installation, descriptions of the screen protector, and/or UPC bar code. In addition, the package can include an aperture, or tab with an aperture, for being hung on a peg in a display. In addition, the package can include a window or transparency through which the screen protector is visible.

Description

As illustrated in FIGS. 1-12, a system 10 is shown for providing screen protection, namely a screen protector 14, to a portable hand-held electronic device, such as a cellular phone 18 (FIG. 13), in an example implementation in accordance with the invention. The cellular phone or cell phone 18 will be referenced throughout as an example of the portable hand-held electronic device. Referring to FIG. 13, the cell phone 18 has a display screen 22 and curved lateral edges 26 on opposite lateral sides of the screen, and defines a front or a user facing surface 30 that faces towards the user during use. The user facing surface 30 can be an active surface of the cell phone 18, providing visual display and allowing for user input, and can be designated a front or forward facing surface of the cell phone. The display screen 22 can extend into the curved lateral edges 26 of the cell phone 18, and can form at least a portion, if not all, of the curved lateral edges 26, so that the display screen 22 itself has curved lateral edges. A majority of the display screen 22 and center portion thereof between the curved lateral edges can be flat. In addition, the display screen 22 can form a majority, and substantially all, of the user facing surface 30. A top and/or bottom of the screen can be banded or framed by the user facing surface. The banded or framed portion of the user facing surface can accommodate accessories, such as a camera lens, a speaker, a button, etc. The cell phone 18 can have a size, shape and/or profile, at least a portion of which, and namely a vast majority of which, is desired to be protected by the screen protector 14. The cell phone 18 can be a predetermined cell phone with a known size and shape; and the screen protector 14 can be sized and shaped to substantially match (with desired gaps and/or contact points) the cell phone 18 or display screen 22 thereof.

Figures 1, 2, 13:
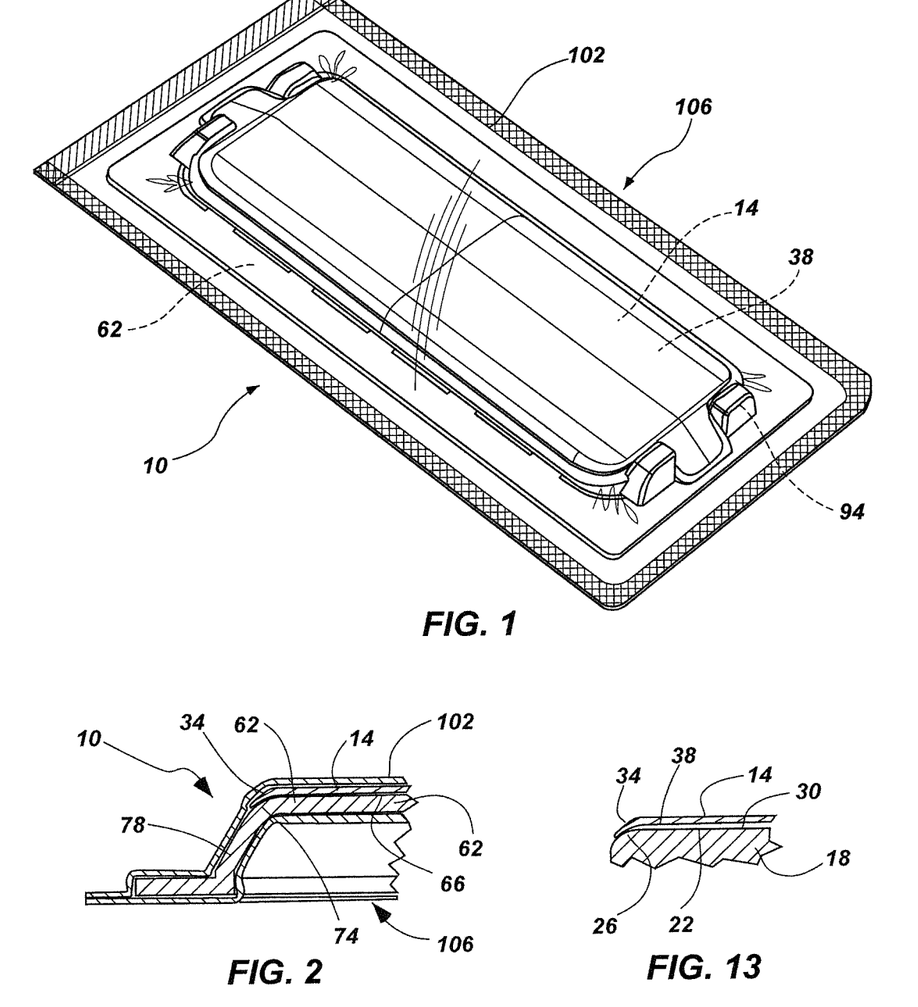
FIG. 1 is a perspective view of a system for providing a screen protector in accordance with an embodiment of the present invention.
FIG. 2 is a partial cross-sectional end schematic view of the system of FIG. 1, shown with details not to scale and exaggerated for illustration.
FIG. 13 is a partial cross-sectional end view of a portable hand-held electronic device with a screen protector of the present invention thereon.

The screen protector 14 can be applied over the user facing surface 30, and the display screen 22, of the cell phone 18. The screen protector 14 has a lateral perimeter that substantial matches the lateral perimeter of the display screen 22 of the cell phone 18, including the curved lateral sides 26. Thus, the screen protector 14 can have curved lateral edges 34 that match or mate with the curved lateral edges 26 of the cell phone 18. In one aspect, a space or gap can be disposed between the screen protector 14 and the display screen 22, while the lateral edges of the screen protector 14 contact the curved edges 26 of the cell phone 18. In addition, longitudinal ends of the screen protector 14 can extend beyond the display screen 22, and can have notches or cut-outs to accommodate accessories of the cell phone 18, such as a camera lens, a speaker, a button, etc. Thus, the screen protector 14 substantially matches, without necessarily exactly matching, the user facing surface 30 of the cell phone 18.

In one aspect, the screen protector can comprise or can be formed of a glass-like plastic infused with sapphire crystals. In another aspect, the screen protector can comprise or can be formed of glass. In one aspect, the material forming the screen protector can be substantially rigid and can hold its shape, while being flexible enough to be deflected when a force is applied, such as by being touched or pushed by a user's finger. In another aspect, the material forming the screen protector can be substantially flexible until it is cured to become rigid and hold its shape, while being flexible enough to be deflected when a force is applied, such as by being touched or pushed by a user's finger. In another aspect, the material forming the screen protector can include multiple layers and/or films of material.

Figure 3:
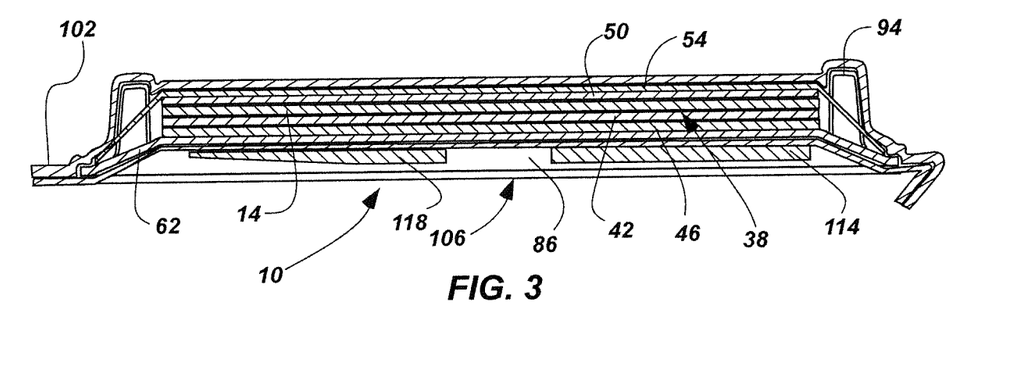
FIG. 3 is a partial cross-sectional side view of the system of FIG. 1, shown with details not to scale and exaggerated for illustration.
Figure 4:
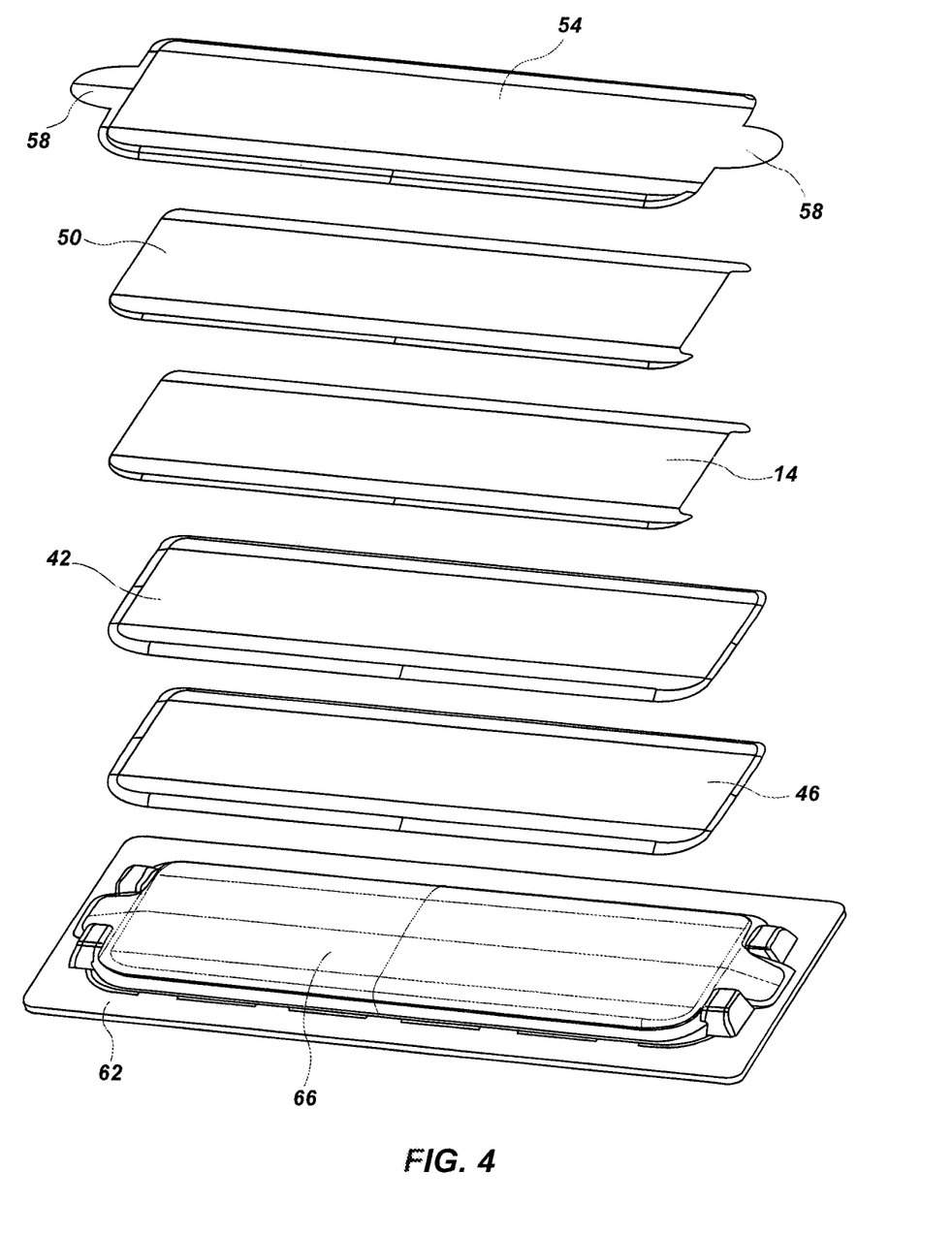
FIG. 4 is a partial exploded view of the system of FIG. 1.
Figure 5:
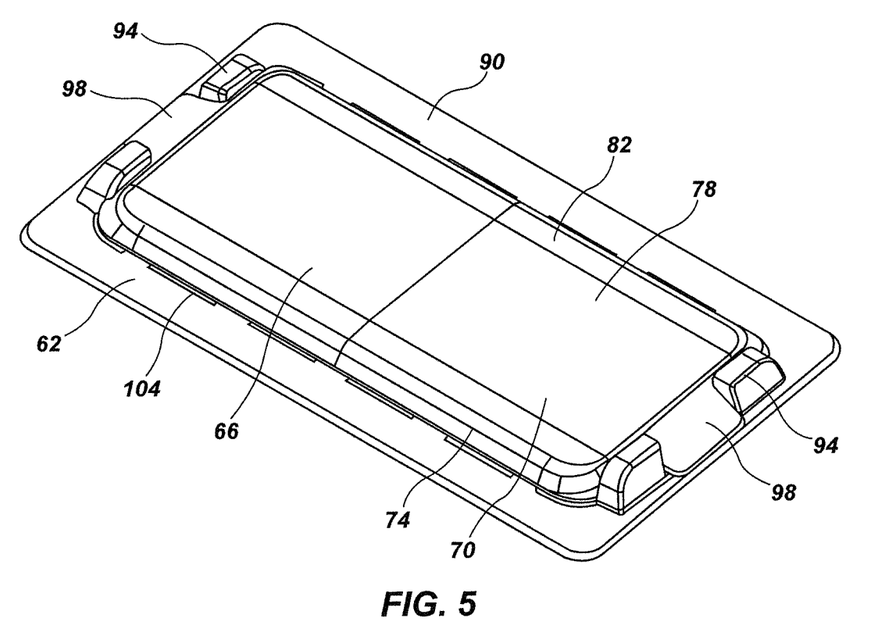
FIG. 5 is a top perspective view of a mold of the system of FIG. 1.
Figure 6:
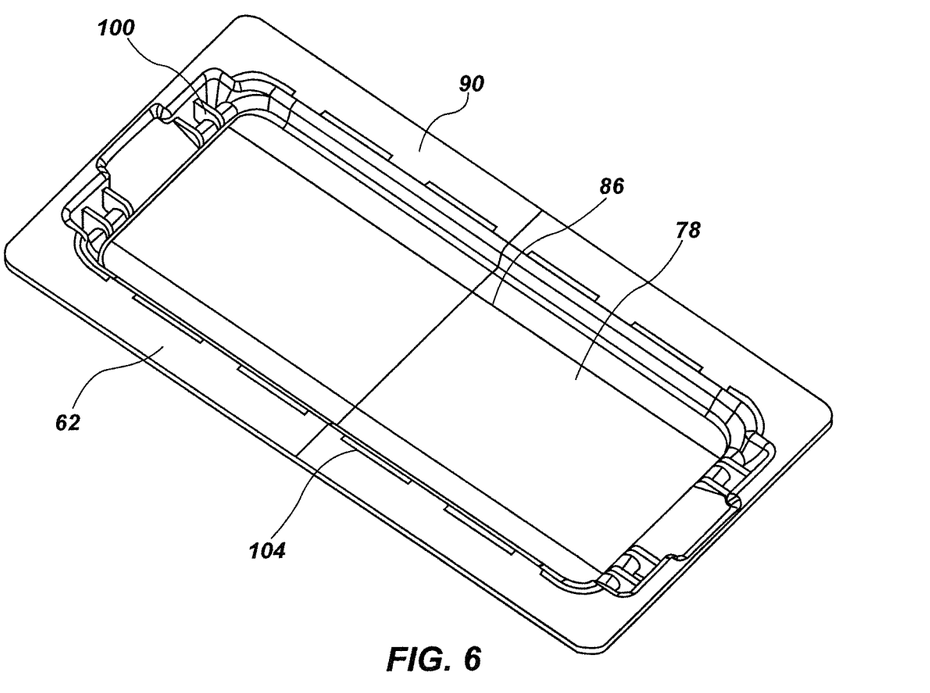
FIG. 6 is a bottom perspective view of the mold of the system of FIG. 1.

Referring to FIGS. 3 and 4, the screen protector 14 can comprise, or can be provided with, layers 38 forming a laminate or stack of layers. The layers 38 or stack of layers can include an adhesive layer 42 adhering the screen protector 14 to the user facing surface 30 of the cellular phone 18. The adhesive layer 42 can have an adhesive perimeter substantially matching at least a portion of a perimeter of the display screen 22 of the cell phone 18, and/or at least a portion of the screen protector 14. In one aspect, the adhesive layer 42 can cover the entire screen protector 14, or inner face thereof. In another aspect, the adhesive layer can extend around an entire perimeter of the screen protector 14. In another aspect, the adhesive layer can be disposed only at the lateral ends of the screen protector. The screen protector 14 can also be provided initially with an inner release liner 46 covering and releasably adhered to the adhesive layer 42. The inner release liner 46 can protect, and can be peeled from, the adhesive layer 42 prior to installation of the screen protector 14 on the cell phone 18. In addition, the screen protector 14 can also be provided initially with an alignment layer 50 disposed over and releasably coupled to an outer surface of the screen protector 14. The alignment layer 50 can be translucent and can have a contrasting color to facilitate positioning and orienting the screen protector 14, with the alignment layer 50 thereon, over the display screen 22 of the cellular phone 18. Furthermore, the layers 38 or stack of layers can include an outer release liner 54 disposed over the alignment layer 50 and the screen protector 14. In one aspect, the outer release liner 54 can also comprise opposite tabs 58 extending from opposite ends thereof to facilitate handling of the screen protector during installation, removal of the outer release liner 54 after installation, and alignment of the layers 38 or stack or layers as described below. In another aspect, the alignment layer can have opposite tabs.

The system 10 and method can provide the screen protector 14 with the curved edges 34, can maintain the curved edges 34 of the screen protector 14 during shipping, and can be used to form the curved edges 34 of the screen protector 14. Referring again to FIGS. 1-12, the system 10 comprises a mold 62 or a tray having an outer surface 66. The mold 62 can carry the screen protector 14, and/or the layers 38 or stack of layers. The inner release liner 46 is disposed over the outer surface 66 of the mold 62. The adhesive layer 42 is disposed over, and attached to, the inner release liner 46. The screen protector 14 is disposed over, and attached to, the adhesive layer 42. The alignment layer 50 can be disposed over, and attached to, the screen protector 14. The outer release liner 54 is disposed over the screen protector 14, and can be disposed over and attached to the alignment layer 50. The mold 62 with the layers 38 or stack of layers (that is the inner release liner 46, the adhesive layer 42, the screen protector 14, the alignment layer 50 and/or the outer release liner 54) disposed over the mold defines a layered part pre-assembly 68, as shown in FIG. 8.

The outer surface 66 of the mold 62 has a size and shape substantially matching the user facing surface 30 of the cell phone 18. The outer surface 66 of the mold 62 can be used to form a shape, including the curved edges 34, of the screen protector 14. Thus, the outer surface 66 of the mold 62 can substantially match the user facing surface 30 of the cell phone 18, without exactly matching it, due to the design of the screen protector 14 with a space or gap designed to be formed between the screen protector 14 and the user facing surface 30 of the cell phone, and with the lateral edges of the screen protector 14 designed to contact the curved edges 26 of the cell phone 18. A flat center portion 70 of the outer surface 66 of the mold can be slightly raised with respect to a corresponding flat center of the display screen 22 to accommodate the gap or space desired between the screen protector and the screen 22; while outermost lateral edges of the outer surface 66 of the mold can correspond to the lateral edges of the screen 22 to provide outermost lateral edges of the screen protector 14 that contact the lateral edges of the display screen 22.

Referring to FIGS. 2, 3 and 5-7, the outer surface 66 of the mold 62 can have a flat center 70 and curved lateral edges 74, matching the flat center portion and the curved lateral edges 34 of the screen protector 14, and similar to the display screen 22 with the curved lateral sides 26. The mold 62 can be a tray comprising a layer 78 having a substantially constant thickness throughout the layer, as shown in FIGS. 2 and 3. Thus, the outer surface 66 of the mold 62 can be formed by a protrusion 82 in the layer 78, and which can have a corresponding indentation 86 in the opposite side of the layer 78, defining a cavity. A flange 90 can extend around a perimeter of the protrusion 82 and the indentation 86. In addition, the mold 62 or tray can further have protrusions 94 (formed by corresponding indentations) extending from the mold 62 around the outer surface 66 of the mold. The protrusions 94 can be formed in the layer 78 with corresponding indentations, as described above. The protrusions 94 can be opposite protrusions extending from the mold 62 at opposite ends of the outer surface 66 of the mold. Opposite notches 98 can be formed in the opposite protrusions 94.

In one aspect, the protrusions 94 can facilitate the stacking of the molds 62 either prior to use, or during processing. The protrusions of a lower mold can be received within corresponding indentations in an upper mold. Thus, the molds can be nested together to resist separation or tipping of a stack of molds. In one aspect, the mold can be a first mold of a plurality of molds, and the layers or stack of layers can be a first layers or stack of layers of a plurality of layers or stacks of layers. Similarly, the layered part pre-assembly can be a first layered part pre-assembly of a plurality of such layered part pre-assemblies. As indicated above, a first mold can be stacked over a second mold. The second mold has protrusions extending from the second mold into indentations of the first mold. Similarly, an upper layered part pre-assembly can be stacked on a lower layered part pre-assembly with the protrusions of the lower mold extending into corresponding indentations of the upper mold. The protrusions can be shaped to provide separation between the adjacent stacked molds so that the layers 38 or stack of layers are separated from a bottom of an upper mold. In one aspect, a rib 100 (FIG. 6) or the like can extend into an indentation and can abut to a top of an adjacent protrusion.

When the screen protector 14, and/or the layers 38 or stack of layers, is carried by the mold 62, the screen protector 14 can be aligned on the outer surface 66 of the mold 62 between the protrusions 94, and/or the opposite tabs 58 of the outer release liner 54 can be received in the opposite notches 98 to align the outer release liner 54, and thus the layers 38 or stack of layers (the inner release liner 46, the adhesive layer 42, the screen protector 14, the alignment layer 50 and/or the outer release liner 54) on the outer surface 66 of the mold 62. The notches 98 can be sloped from the outer surface 66 to the flange 90 of the mold to accommodate the tabs 58 thereon during a vacuum process, described below.

Referring again to FIGS. 1-12, the system 10 comprises a vacuum bag 102 receiving and surrounding the layered part pre-assembly 68, or the layers 38 or stack of layers (the inner release liner 46, the adhesive layer 42, the screen protector 14, the alignment layer 50 and/or the outer release liner 54) disposed over the mold 62. The bag 102 has a cavity therein and can be sealed along a periphery with an opening through the periphery into the cavity through which the layered part pre-assembly 68 can be inserted prior to being sealed. The vacuum bag 102 is sealed and evacuated of air, defining a vacuum bag pre-assembly. Thus, atmospheric pressure presses the layers 38 or stack of layers into the mold 62 or outer surface 66 thereof. In one aspect, the vacuum bag 102 and atmospheric pressure, along with heating and/or curing the screen protector 14, can form the lateral edges 34 of the screen protector 14 against the curved lateral edges 74 of the outer surface 66 of the mold 62. In another aspect, the screen protector 14 can be formed with the curved lateral edges 34 prior to being disposed on the outer surface 66 of the mold 62, and prior to insertion into the vacuum bag 102. In another aspect, the vacuum bag 102 and atmospheric pressure can maintain the curved lateral edges 34 of the screen protector 14 against the curved lateral edges 74 of the outer surface 66 of the mold 62 during shipping, packaging, etc. In one aspect, the mold 62 can have slots 104 or holes therethrough to facilitate air flow during vacuum sealing. The slots 104 or holes can be formed in the flange 90 and can extend around the outer surface 66 of the mold. The vacuum bag 102 conforms to the mold 62 with the stack of layers 38 thereon when evacuated of air.

Figure 10:
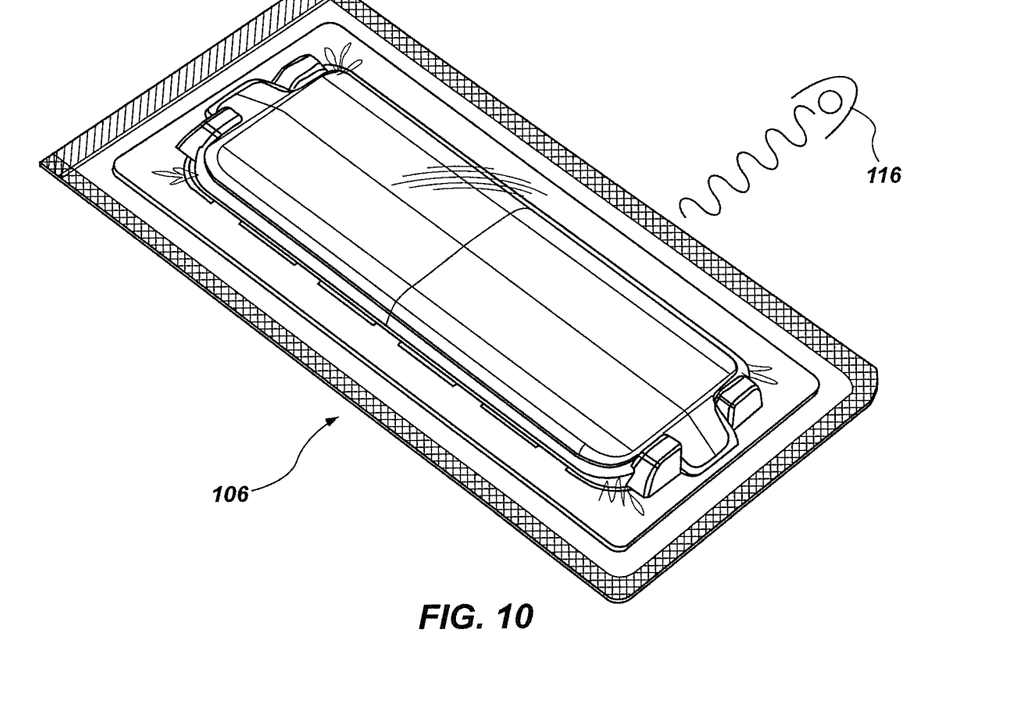

As described above, the curved lateral edges 34 of the screen protector 14 can be formed on the curved lateral edges 74 of the outer surface 66 of the mold 62, and while in the vacuum bag 102. Thus, the screen protector can initial be flat, without curved lateral edges or with lateral edges that are flat and co-planar with the flat center portion of the screen protector, and can be stacked on the mold with the other layers with a gap or space between the lateral edges of the screen protector and the curved lateral edges of the mold. The curved lateral edges 34 of the screen protector 14 can be formed against the curved lateral edges 74 of the outer surface 66 of the mold 62 by pressure from the vacuum bag 102, and heat and/or curing, such as from such as a UV curing oven 116 (FIG. 10). Then the curved lateral edges 34 of the screen protector 14 can be maintained against the curved lateral edges 74 of the outer surface 66 of the mold 62 by the vacuum bag 102, such as during shipping, handling, storage, packaging, processing, etc. The vacuum bag 102, sealed and evacuated of air, with the layered part pre-assembly 68 therein, defines a final assembly 106, as shown in FIG. 1.

The protrusions 94 of the mold 62 can be tapered to accommodate the vacuum bag 102 thereon so that the molds, or final assemblies, can be stacked together prior to packaging.

Figure 11:
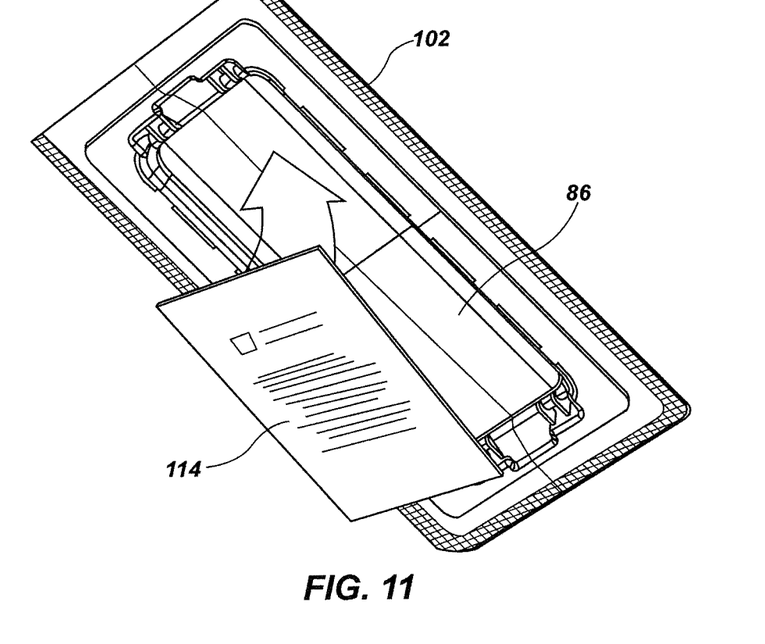
Figure 12:
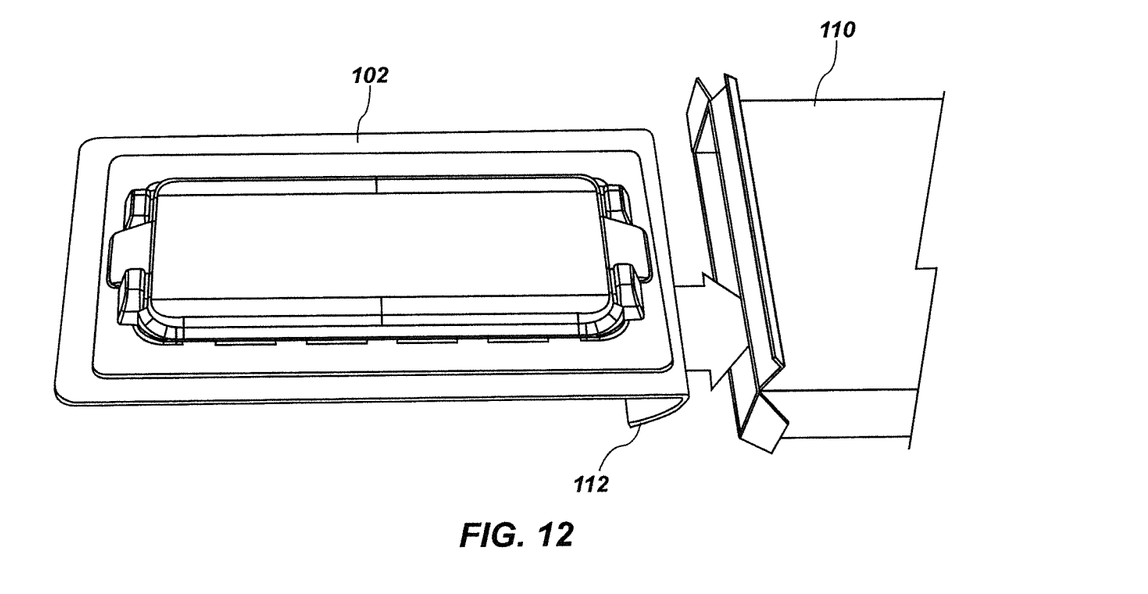

Referring to FIG. 12, the final assembly 106 can be inserted into a retail package 110. A lip or edge 112 of the vacuum bag 102 can be folded over and back under the final assembly 106 to allow for easy and guided installation into the opening of the retail package 110. Referring to FIGS. 1 and 11, accessories can be inserted into the cavity formed by the indentation 86 on the bottom of the mold 62. In one aspect, the accessories can be inserted in the cavity or indentation 86 and outside of the vacuum bag 102, as shown. In another aspect, the accessories can be inserted in the cavity or indentation 86 and inside of the vacuum bag 102. The accessories can include instructions or an instruction pamphlet 114 for installation of the screen protector on cell phone, and/or a squeegee 118 for use in the installation of the screen protector on the cell phone.

Figure 7:
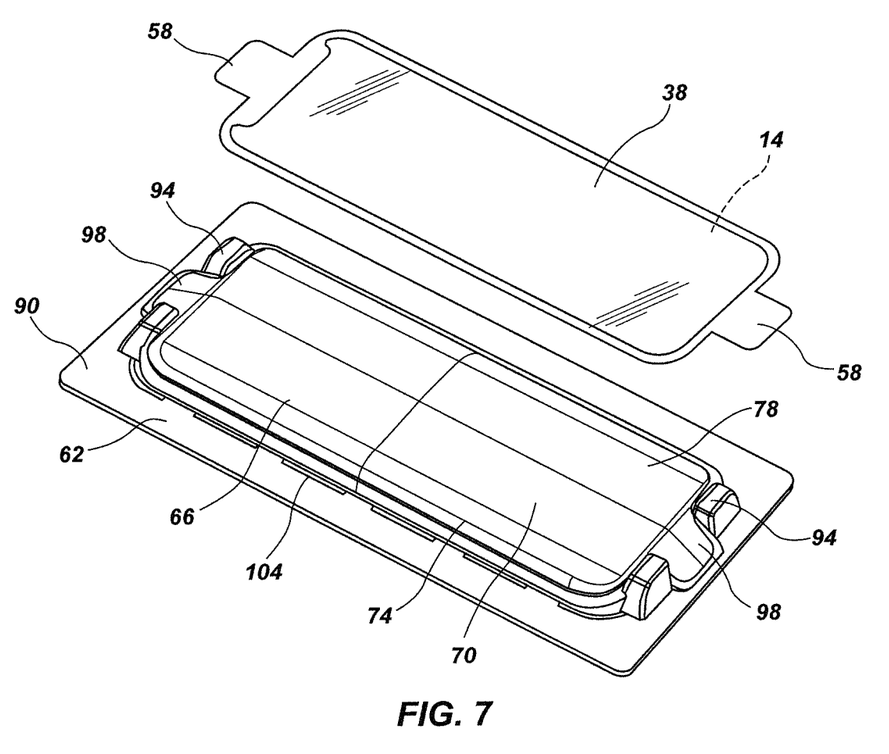
FIG. 7-12 show a method of providing the screen protector in accordance with an embodiment of the present invention.
Figure 8:
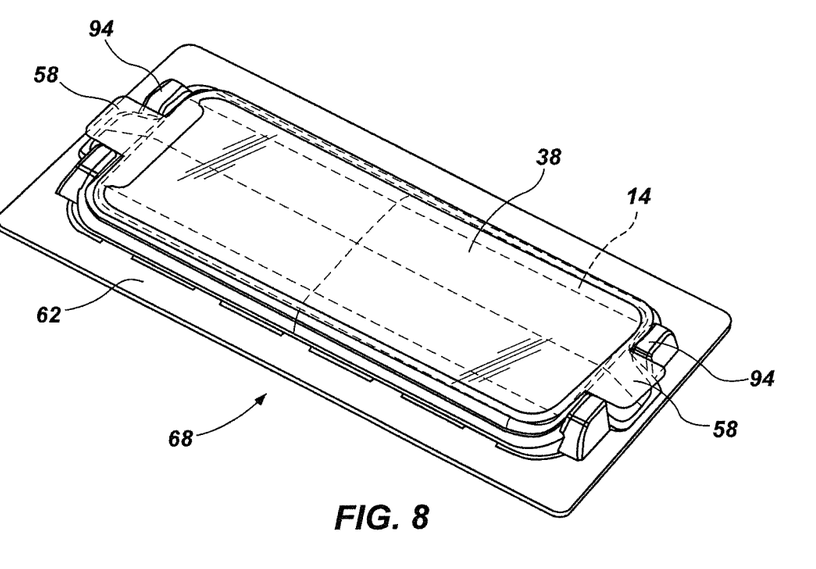
Figure 9:
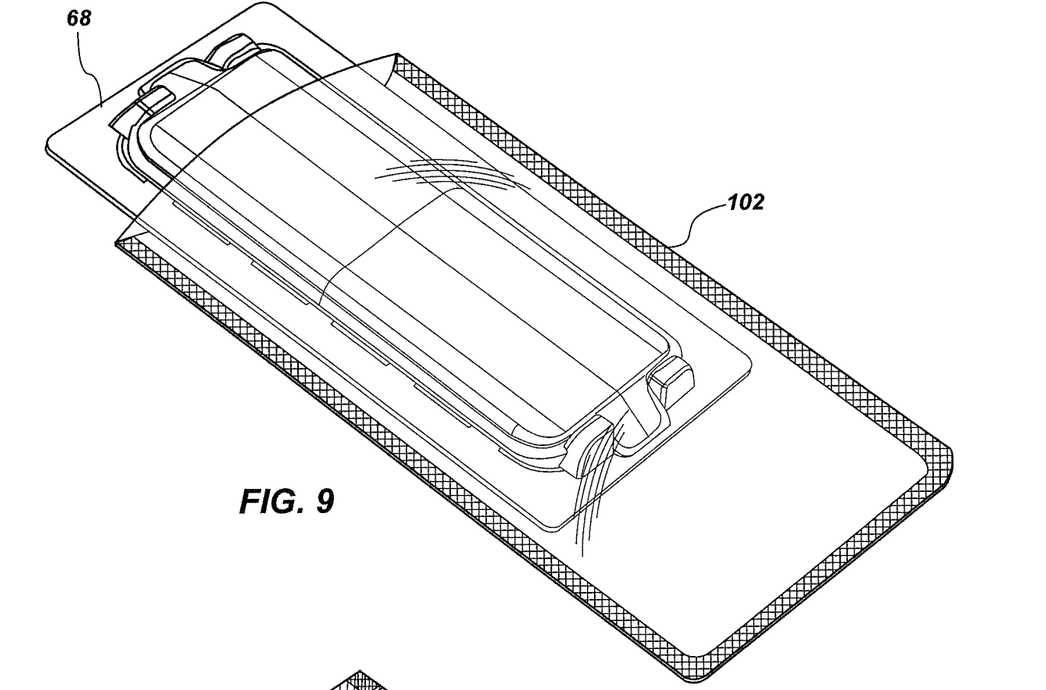

Referring to FIGS. 7-12, a method for providing screen protection to a portable handheld electronic device or cell phone 18 (FIG. 13) is shown. As described above, the cell phone 18 has a display screen 22 and curved lateral edges 26 defining a user facing surface 30, as shown in FIG. 13. The method comprises providing the mold 62 having the outer surface 66 with a size and shape substantially matching the user facing surface 30 of the cell phone 18, as shown in FIGS. 7 and 8. The screen protector 14 is shaped over the outer surface 66 of the mold 62 to have a shape substantially matching the outer surface 66 of the mold 62, and thus the user facing surface 30 of the cell phone 18, as shown in FIGS. 9 and 10. The screen protector 14 is maintained over the mold 62 during shipping and/or retail packaging, as shown in FIG. 12.

Referring to FIG. 7, in one aspect, the layers 38 can be stacked together forming a stack of layers. The layers 38 or stack of layers can comprise at least: the inner release liner 46, the adhesive layer 42, the screen protector 14, and the outer release liner 54. One of the layers, such as the outer release liner 46 can have opposite tabs 58 extending from opposite ends thereof. The layers can also include the alignment layer 50.

Referring to FIG. 8, the layers 38 of stack of layers can be aligned on the mold 62 with the opposite tabs 58 of the layers 38 or the stack of layers between the opposite notches 98 formed between the opposite protrusions 94 extending from the mold 62 at opposite ends of the outer surface 66 of the mold. In one aspect, the layers 38 can be stacked together, and attached together, prior to being disposed on the mold 62. In another aspect, the layers 38 can be sequentially disposed on the mold 62. As described above, the layers 38 or stack of layers disposed on the mold 62 can define the layered part pre-assembly 68.

In one aspect, the screen protector 14 can be cut to have a lateral perimeter substantially matching the lateral perimeter of the display screen 22 of the cell phone 14. The screen protector 14 can be aligned on the outer surface 66 of the mold 62 with the protrusions 94 extending from the mold around the outer surface of the mold. The adhesive layer 42 can be cut to have a perimeter that matches the perimeter of the screen protector 14. In another aspect, the adhesive layer can be applied to the screen protector, and then both the screen protector and the adhesive layer can be cut together. Similarly, the remaining layers 38 (the inner release liner 46, the alignment layer 50 and/or the outer release liner 54) can be cut to fit the screen protector 14.

In one aspect, shaping the screen protector 14 over the mold 62 can comprise disposing the layered part pre-assembly 68 in the vacuum bag 102. The vacuum bag 102 can be sealed and evacuated with the layered part pre-assembly 68 therein, defining a vacuum bag pre-assembly. The screen protector 14 can be heated and/or cured while in the vacuum bag 102 as part of the vacuum bag pre-assembly 68 to shape the screen protector 14 over the mold 62 to have the curved lateral edges 34 substantially matching the curved lateral edges 26 of the display screen 22 of the cellular phone 18, and the curved lateral edges 74 of the outer surface 66 of the mold 62, defining the final assembly 106. The screen protector 14 can be heated and/or cured by placing the entire vacuum bag pre-assembly in a UV oven, represented by 116 in FIG. 10. The vacuum bag pre-assembly is similar to the final assembly, but in the vacuum bag pre-assembly the lateral edges of the screen protector have not yet been shaped to have curved lateral edges.

In addition, the remaining layers 38 can be provided on the mold 62 either separately or together prior to insertion into the vacuum bag. For example, the method can further comprise forming a stack of layers 38 comprising at least: the screen protector 14; the adhesive layer 42 on the screen protector; the inner release liner 46 covering the adhesive layer 42; and the outer release liner 54 disposed over the screen protector 14. In addition, the stack of layers 38 can include the alignment layer 50. The stack of layers 38 is disposed on the mold 62, defining the layered part pre-assembly 66. As another example, the method can further comprise: providing the inner release liner 46 over the outer surface 66 of the mold 62; disposing the adhesive layer 42 over the inner release liner 46, with the adhesive layer 42 having an adhesive perimeter substantially matching at least a portion of a perimeter of the screen protector 14; disposing the screen protector 14 over the adhesive layer 42, with the screen protector 14 having a lateral perimeter substantially matching a lateral perimeter of the display screen 22 of the cell phone 18; and disposing the outer release liner 54 over the screen protector 14. The mold 62, the inner release liner 46, the adhesive layer 42, the screen protector 14 and the outer release liner 54 (and the alignment layer 50) can form the layered part pre-assembly 68.

Referring to FIG. 11, the method can further include placing the squeegee 118 and/or the instruction pamphlet 114 in the cavity or indentation 86 of the mold 62 opposite the outer surface 66.

Referring to FIG. 12, the method can further include inserting the final assembly 106 into the retail package 110. As described above, the lip or edge 112 of the vacuum bag 102 can be folded over and back under the final assembly 106 to allow for easy and guided installation into the opening of the retail package 110.

Referring again to FIGS. 7-12, a method for providing screen protection to the portable handheld electronic device or cell phone 18 comprises: providing the mold 62 having the outer surface 66 with a size and shape substantially matching the user facing surface 30 of the cell phone 18 (FIG. 7); providing the screen protector 14 having a lateral perimeter substantially matching a lateral perimeter of the display screen 22 of the cell phone 18 (FIG. 7); disposing a stack of layers 38, either individually or together, onto the outer surface 66 of the mold 62, defining the layered part pre-assembly 68, with the stack of layers 38 comprising at least: the inner release liner 46, an adhesive layer 42, the screen protector 14, and the outer release liner 54 (and the alignment layer 50) (FIG. 8); disposing the layered part pre-assembly 68 in the vacuum bag 102 (FIG. 9); sealing and evacuating the vacuum bag 102 with the layered part pre-assembly 68 therein, defining a vacuum bag pre-assembly (FIG. 10); and heating and/or curing the screen protector 14 while in the vacuum bag 102 to shape the screen protector 14 over the outer surface 66 of the mold 62 to have curved lateral edges 34 substantially matching the curved lateral edges 26 of the display screen 22 of the cellular phone 18, and the curved lateral edges 74 of the outer surface 66 of the mold 62, defining a final assembly 106 (FIG. 10). The screen protector can be heated and/or cured by placing the entire vacuum bag pre-assembly in a UV oven, represented by 116 in FIG. 10.

Layering the layers 38 can further comprise: stacking the layers 38 together forming a stack of layers with opposite tabs 58 extending from opposite ends of the outer release liner 54 (FIG. 7); and aligning the opposite tabs 58 of the stack of layers between opposite notches 98 formed between opposite protrusions 94 extending from the mold 62 at opposite ends of the outer surface 66 of the mold (FIG. 8).

In one aspect, the screen protector 14 can be cut to have a lateral perimeter substantially matching the lateral perimeter of the display screen 22 of the cell phone 14. The screen protector 14 can be aligned on the outer surface 66 of the mold 62 between the protrusions 94 extending from the mold around the outer surface of the mold. The adhesive layer 42 can be cut to have a perimeter that matches the perimeter of the screen protector 14. In another aspect, the adhesive layer can be applied to the screen protector, and then both the screen protector and the adhesive layer can be cut together. Similarly, the remaining layers 38 (the inner release liner 46, the alignment layer 50 and/or the outer release liner 54) can be cut to fit the screen protector 14.

As described above, the method can further include maintaining the final assembly 106 together during shipping and or packaging (FIG. 12) of the screen protector 14.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A system configured to provide screen protection to a portable handheld electronic device having a display screen and curved lateral edges defining a user facing surface, the system comprising:
   a) a mold having a layer with a protrusion in the layer and a flange extending around a perimeter of the protrusion, the protrusion forming an outer surface configured to substantially match the user facing surface of the portable handheld electronic device;
   b) the outer surface having a flat center and curved lateral edges;
   c) the layer further having opposite protrusions extending at opposite ends of the outer surface;
   d) opposite notches formed in the opposite protrusions, respectively, at opposite ends of the outer surface;
   e) the opposite notches being sloped from the outer surface to the flange;
   f) a stack of layers disposed over the outer surface of the mold, comprising at least:
      i) a screen protector having a lateral perimeter substantially matching a lateral perimeter of the display screen of the portable handheld electronic device, and having a flat center and curved lateral edges;
      ii) an adhesive layer on the screen protector;
      iii) an inner release liner covering the adhesive layer and disposed over the outer surface of the mold;
      iv) an outer release liner disposed over the screen protector;
      v) opposite tabs extending from opposite ends of the outer release liner; and
      vi) the opposite tabs received in the opposite notches to align the outer release liner, and thus the stack of layers, on the outer surface of the mold;
   g) a vacuum bag receiving and surrounding the stack of layers disposed over the mold; and
   h) the vacuum bag being sealed and evacuated of air, with the vacuum bag maintaining the curved lateral edges of the screen protector against the curved lateral edges of the outer surface of the mold.

2. The system in accordance with claim 1, wherein the curved lateral edges of the screen protector are maintained against the curved lateral edges of the outer surface of the mold by the vacuum bag during shipping.

3. The system in accordance with claim 1, further comprising:
   a retail package with the vacuum bag therein.

4. The system in accordance with claim 1, further comprising:
   a squeegee and an instruction pamphlet disposed in a cavity of the mold opposite the outer surface.

5. The system in accordance with claim 1, wherein the mold is a tray comprising a layer having a substantially constant thickness throughout the layer.

* * * * *